(12) United States Patent
Gould et al.

(10) Patent No.: US 8,981,989 B2
(45) Date of Patent: Mar. 17, 2015

(54) PROJECTILE DETECTION SYSTEM

(75) Inventors: Dale Martin Gould, Chelmsford (GB); Robert Ian Henderson, Chelmsford (GB); David John Shephard, Chelmsford (GB); Barbara Helen Wright, Chelmsford (GB)

(73) Assignee: BAE Systems plc, London (GB)

( * ) Notice: Subject to any disclaimer, the term of this patent is extended or adjusted under 35 U.S.C. 154(b) by 211 days.

(21) Appl. No.: 13/638,910

(22) PCT Filed: Mar. 25, 2011

(86) PCT No.: PCT/GB2011/050606
§ 371 (c)(1),
(2), (4) Date: Oct. 1, 2012

(87) PCT Pub. No.: WO2011/121338
PCT Pub. Date: Oct. 6, 2011

(65) Prior Publication Data
US 2013/0021195 A1    Jan. 24, 2013

(30) Foreign Application Priority Data

Apr. 1, 2010    (EP) .................................... 10250713
Apr. 1, 2010    (GB) .................................... 1005593.7

(51) Int. Cl.
*G01S 13/00*    (2006.01)
*G01S 13/58*    (2006.01)
(Continued)

(52) U.S. Cl.
CPC ................. *G01S 7/35* (2013.01); *G01S 13/583* (2013.01); *G01S 13/66* (2013.01)
USPC ............. 342/113; 342/70; 342/114; 342/146; 342/147; 342/156; 342/175

(58) Field of Classification Search
CPC ......... G01S 13/00; G01S 13/04; G01S 13/06; G01S 13/42–13/4409; G01S 13/50; G01S 13/58; G01S 13/583; G01S 13/589; G01S 13/62
USPC ............. 342/70–72, 104, 107, 108, 113–117, 342/133, 139, 146–164, 175
See application file for complete search history.

(56) References Cited

U.S. PATENT DOCUMENTS 3,295,128 A  *  12/1966  Canaday et al. ............... 342/129
3,982,713 A  *   9/1976  Martin ........................... 244/3.1
(Continued)

FOREIGN PATENT DOCUMENTS

EP          0162351            11/1985
EP          1666915 A1          6/2006
(Continued)

OTHER PUBLICATIONS
International Search Report dated May 24, 2011 issued in PCT/GB2011/050606.
(Continued)

*Primary Examiner* — Peter Bythrow
(74) *Attorney, Agent, or Firm* — Scully, Scott, Murphy & Presser, PC

(57) ABSTRACT

A projectile detection system, and method of detecting a projectile (for example a bullet), for use on a vehicle (100) (for example a helicopter), the projectile detection system comprising: a radar antenna array (4) arranged to transmit and receive microwave signals so as to provide a plurality of detection segments (40, 42, 44, 46) of a volume of airspace (38); one or more processors (3) arranged to: determine which segments (40, 42, 44, 46) microwave signals reflected by a projectile (10) are received from; determine timing information relating to a time order in which the received microwave signals are received; and determine directional information relating to a direction of travel of the projectile (10) using the determined segments (40, 42, 44, 46) and the determined timing information; wherein the microwave signals have a frequency between 1 GHz and 30 GHz.

13 Claims, 7 Drawing Sheets

(51) Int. Cl.
*G01S 13/08* (2006.01)
*G01S 7/35* (2006.01)
*G01S 13/66* (2006.01)

(56) References Cited

U.S. PATENT DOCUMENTS

| | | | |
|---|---|---|---|
| 4,140,060 A * | 2/1979 | Brenner | 102/214 |
| 4,549,184 A * | 10/1985 | Boles et al. | 342/25 B |
| 4,751,511 A * | 6/1988 | Komata et al. | 342/59 |
| 4,925,129 A * | 5/1990 | Salkeld et al. | 244/3.11 |
| 5,631,654 A * | 5/1997 | Karr | 342/107 |
| 5,757,310 A * | 5/1998 | Millward | 342/95 |
| 6,078,289 A * | 6/2000 | Manoogian et al. | 342/373 |
| 6,262,680 B1 * | 7/2001 | Muto | 342/74 |
| 6,771,205 B1 * | 8/2004 | Barton et al. | 342/13 |
| 7,066,427 B2 * | 6/2006 | Chang | 244/3.19 |
| 7,104,496 B2 * | 9/2006 | Chang | 244/3.19 |
| 7,151,478 B1 * | 12/2006 | Adams et al. | 342/62 |
| 7,205,932 B2 * | 4/2007 | Fiore | 342/133 |
| 7,248,210 B2 * | 7/2007 | Bruce et al. | 342/175 |
| 7,277,046 B2 * | 10/2007 | Adams et al. | 342/147 |
| 7,492,308 B2 * | 2/2009 | Benayahu et al. | 342/52 |
| 7,522,095 B1 * | 4/2009 | Wasiewicz et al. | 342/160 |
| 7,643,377 B1 * | 1/2010 | Uzes | 367/135 |
| 7,696,919 B2 * | 4/2010 | Moraites | 342/14 |
| 7,782,710 B1 * | 8/2010 | Uzes | 367/135 |
| 7,825,853 B2 * | 11/2010 | Bruce et al. | 342/175 |
| 8,068,052 B2 * | 11/2011 | Nakada et al. | 342/29 |
| 2005/0275582 A1 * | 12/2005 | Mohan | 342/13 |
| 2006/0092075 A1 * | 5/2006 | Bruce et al. | 342/175 |
| 2006/0097102 A1 * | 5/2006 | Chang | 244/3.19 |
| 2006/0175464 A1 * | 8/2006 | Chang | 244/3.19 |
| 2007/0018884 A1 * | 1/2007 | Adams et al. | 342/147 |
| 2007/0040062 A1 * | 2/2007 | Lau et al. | 244/3.16 |
| 2008/0273190 A1 * | 11/2008 | Smith | 356/4.01 |
| 2009/0091490 A1 * | 4/2009 | Tu et al. | 342/160 |
| 2009/0174589 A1 * | 7/2009 | Moraites | 342/14 |

FOREIGN PATENT DOCUMENTS

| | | |
|---|---|---|
| GB | 2033691 A | 4/1980 |
| JP | 2009-128016 A | 6/2009 |
| WO | WO2007/045104 A1 | 4/2007 |

OTHER PUBLICATIONS

European Search Report dated May 4, 2011 issued in EP10250713.
UK Search Report dated Feb. 4, 2011 issued in GB1005593.7.

* cited by examiner

PROJECTILE DETECTION SYSTEM

FIELD OF THE INVENTION

The present invention relates to projectile detection systems for use on vehicles.

BACKGROUND

Helicopters can come under enemy fire in conflict situations. This enemy fire may include small arms fire and heavy machine gun fire.

If a helicopter pilot was aware that the helicopter was under enemy fire, evasive action could be taken. This may break the lock the enemy has on the helicopter, which would minimise damage to the aircraft structure and safeguard personnel.

Thus it is desirable to detect incoming enemy fire, from small arms fire up to heavy machine gun fire. It would also be desirable to determine the direction of the incoming enemy fire. For example, information related to the direction of incoming enemy fire could be used to prevent the helicopter turning into the enemy fire, or to identify the location of the enemy e.g. by incorporating it with information about the local terrain.

SUMMARY OF THE INVENTION

In a first aspect the present invention provides a projectile detection system for use on a vehicle, the projectile detection system comprising a radar antenna array arranged to transmit and receive microwave signals so as to provide a plurality of detection segments of a volume of airspace, one or more processors arranged to determine which segments of the plurality of segments received microwave signals reflected by the projectile are received from, determine timing information relating to a time order in which the received microwave signals are received, and determine directional information relating to a direction of travel of the projectile using the determined segments in which the received microwave signals reflected by the projectile are received from and the determined timing information, wherein the microwave signals have a frequency between 1 GHz and 30 GHz.

The microwave signals may have a frequency between 7 GHz and 17 GHz.

The microwave signals may have a frequency between 10 GHz and 14 GHz.

The radar antenna array may comprise a plurality of transmitters, each transmitter in the plurality being arranged to transmit microwave signals into a respective segment of the plurality of segments, a plurality of receivers, each receiver in the plurality being arranged to receive microwave signals reflected by the projectile from a respective segment of the plurality of segments, and shielding means arranged to prevent microwave signals transmitted from a transmitters being directly received by a receiver without first being reflected by an object.

The microwave signals may have a continuous waveform.

The volume of airspace may be a volume of airspace substantially surrounding a portion of the vehicle.

At least two of the segments may overlap to some extent.

The projectile detection system may further comprise means for determining a radial velocity of the projectile.

The means for determining a radial velocity of the projectile may be adapted to determine a radial velocity of the projectile using a Doppler profile of the received microwave signals.

In a further aspect, the present invention provides a vehicle comprising a projectile detection system according to the above aspect.

The vehicle may be an aircraft.

In a further aspect, the present invention provides a method of detecting a projectile comprising transmitting microwave signals so as to provide a plurality of detection segments of a volume of airspace, receiving microwave signals reflected by the projectile, determining which segments of the plurality of segments received microwave signals reflected by the projectile are received from, determining timing information relating to a time order in which the received microwave signals are received, and determining directional information relating to a direction of travel of the projectile using the determined segments in which the received microwave signals reflected by the projectile are received from and the determined timing information, wherein the microwave signals each have a frequency between 1 GHz and 30 GHz.

The microwave signals may each have a frequency between 7 GHz and 17 GHz.

The microwave signals may each have a frequency between 10 GHz and 14 GHz.

The projectile may be a bullet.

DETAILED DESCRIPTION

Figure 1:
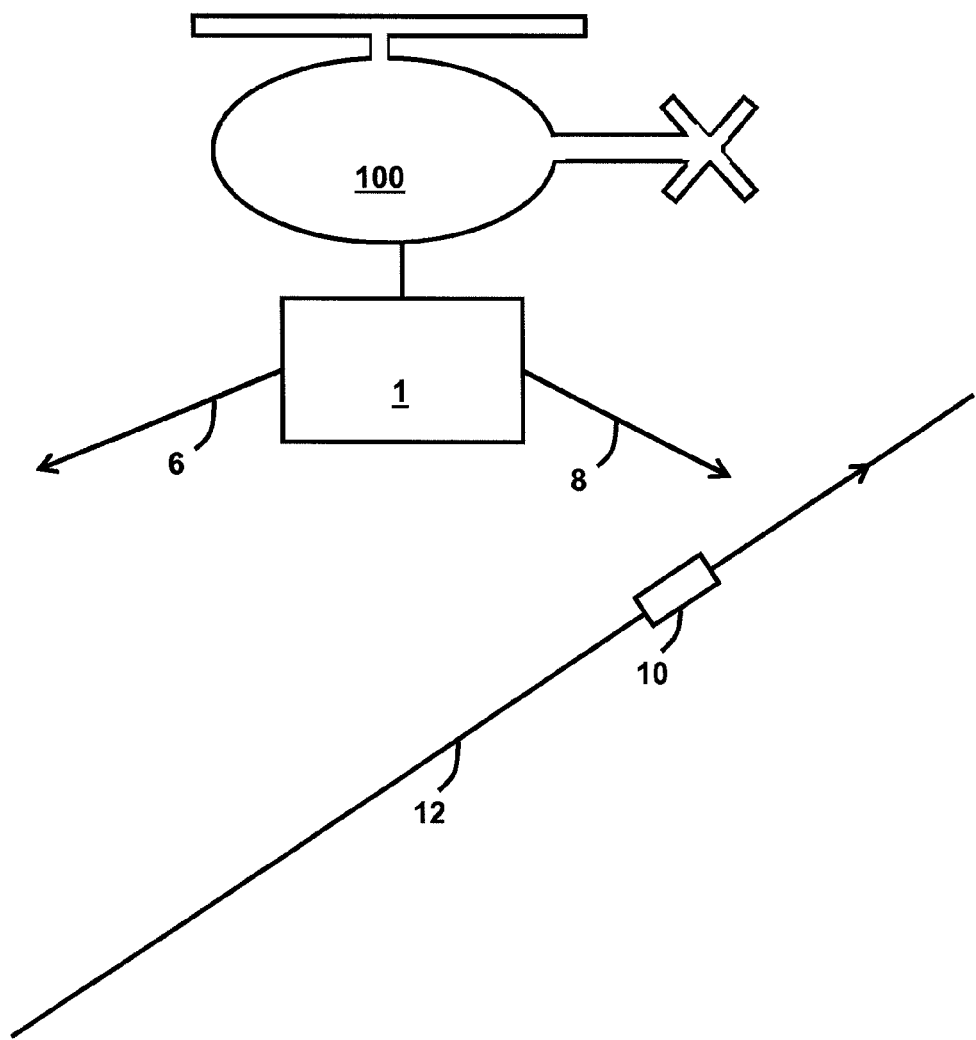
FIG. 1 is a schematic illustration of a bullet detection system connected to a helicopter.

FIG. 1 is a schematic illustration of a bullet detection system 1 connected to a helicopter 100. The bullet detection system 1 emits microwaves 6, 8 to detect bullets in the vicinity of the bullet detection system. For clarity, the detection of single bullet, hereinafter referred to as "the bullet 10", by this example of an embodiment of the bullet detection system 1, is considered. The path of the bullet 10, hereinafter referred to as "the bullet path 12" is schematically depicted in FIG. 2 as an arrow.

There are a number of bullet calibres that may be used against the helicopter 100. Typical calibres are:

i) 5.45 mm×39 mm. Muzzle velocity 840 m/s.
ii) 5.56 mm×45 mm. Muzzle velocity 940 m/s.
iii) 7.62 mm×51 mm. Muzzle velocity 823 m/s
iv) 7.62 mm×39 mm. Muzzle velocity 715 m/s.
v) 9 mm×19 mm. Muzzle velocity 360 m/s.
vi) 12.7 mm×99 mm. Muzzle velocity 928 m/s.
vii) 12.7 mm×108 mm. Muzzle velocity 817 m/s.

Figure 2:
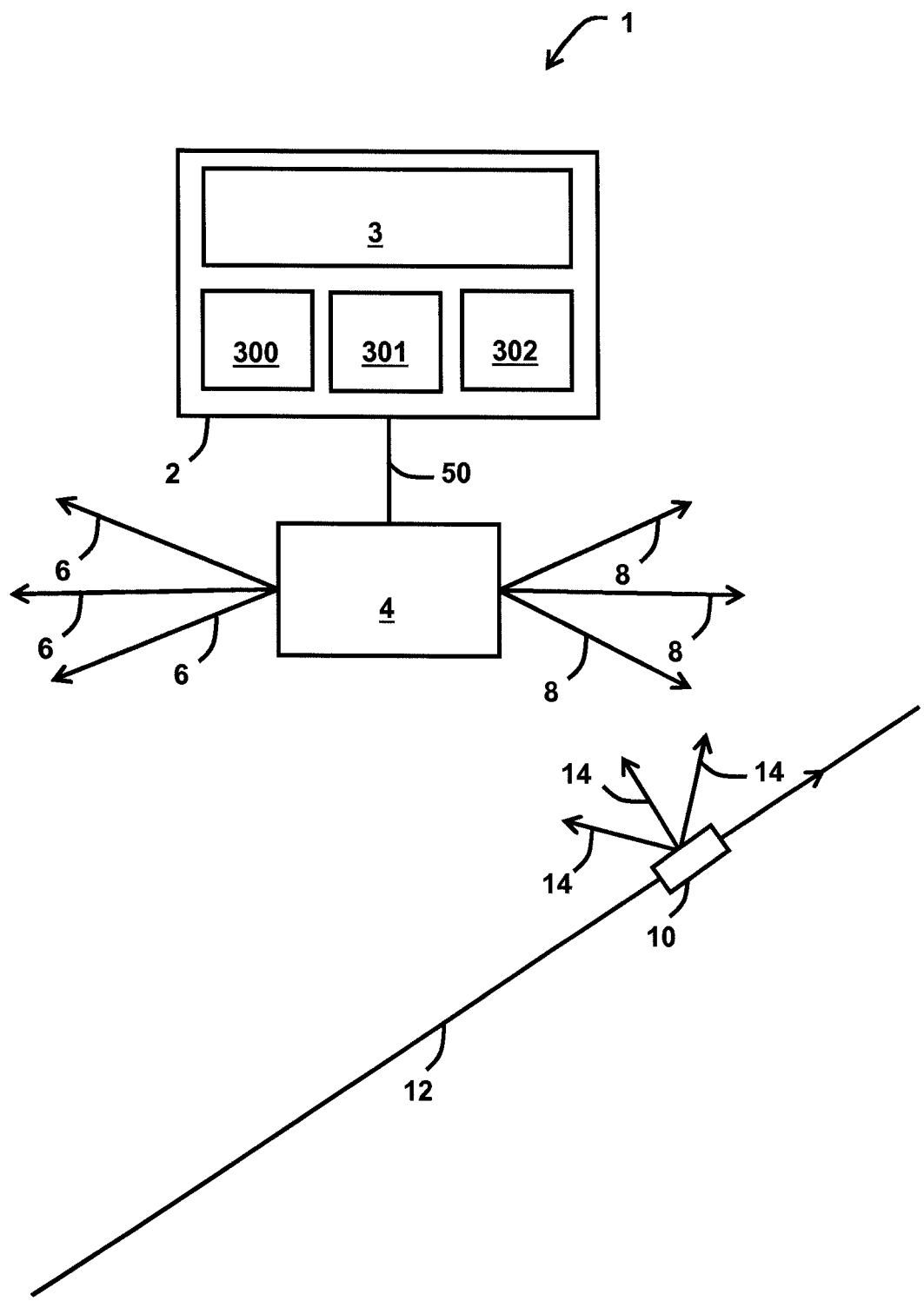
FIG. 2 schematically shows the effect of a bullet travelling through a region of airspace into which a radar antenna array transmits microwaves.

FIG. 2 is a schematic illustration of an embodiment of a bullet detection system 1 for detecting bullets in the vicinity of the bullet detection system 1. The bullet 10 and the bullet path of FIG. 1 are also shown in FIG. 2.

The bullet detection system 1 comprises a controller 2 and a radar antenna array 4. The controller 2 is connected to the radar antenna array 4 via a connection 50.

The controller comprises a processor 3, a clock 300, a transmitter 301 and a receiver 302.

In operation, the transmitter 301 transmits a signal, hereinafter referred to as the "broadcast signal" to the radar antenna array 4. The broadcast signal is transmitted to the radar antenna array 4 via the connection 50.

The radar antenna array 4 receives the broadcast signal from the transmitter 301. In this embodiment, the radar antenna array 4 transmits four discrete microwave signals that depend on the broadcast signal. Each of the four microwave signals are directed from the radar antenna array 4 into a respective distinct region of airspace. In FIG. 2, for clarity, only two of these microwave signals are schematically depicted. A first microwave signal 6, schematically represented by a first set of arrows labelled by the reference numerals 6, is directed into a region of airspace. A second microwave signal 8, schematically represented by a second set of arrows labelled by the reference numerals 8, is directed into a further region of airspace, distinct from the region of airspace in to which the first microwave signal 6 is directed.

In this embodiment, the radar antenna array 4 has the following parameters:
Transmit Power: 1 mW (0 dBm)
RF Frequency: 12 GHz
Analogue to Digital Converter (ADC): 4 off, 1 MHz, 3 MHz, or 10 MHz
Bandwidth: ±31.25 kHz for a 1 MHz ADC; same footprint for the 3 MHz and 10 MHz ADCs
Noise Figure: 3 dB
Waveform: continuous waveform (CW)

FIG. 2 schematically shows the effect of a bullet travelling through a region of airspace into which the radar antenna array transmits microwaves 6, 8. In particular, the transmitted microwaves 6, 8 are reflected by the bullet 10 under consideration in this example. The reflected microwaves 14 are shown schematically in FIG. 2 as a set of arrows 14 originating from the bullet 10. The reflected microwaves constitute a microwave signal. Part of this reflected microwave signal is directed back to the radar antenna array 4. This signal is received by the radar antenna array 4. The received signal is forwarded from the radar antenna array 4 to the receiver 302 via the connection 50. The forwarded signal is hereinafter referred to as the "detected signal".

In operation, the detected signal is received by the receiver 302. The detected signal corresponds to the microwave signal received by the radar antenna array 4.

In this embodiment, the processor 3 processes the detected signal received by the receiver 302. This processing of the detected signal performed by the processor 3 will be described in more detail later below with reference to FIG. 5.

In this embodiment, the clock 300 is used by the processor 3 in the processing of the second signal, as described later below with reference to FIG. 5. A clock value read from the clock 300 or other clock output is used by the processor 3 to control and compare signals transmitted by the transmitter 301 (the broadcast signal) and received by the receiver 302 (the detected signal).

Figure 3:
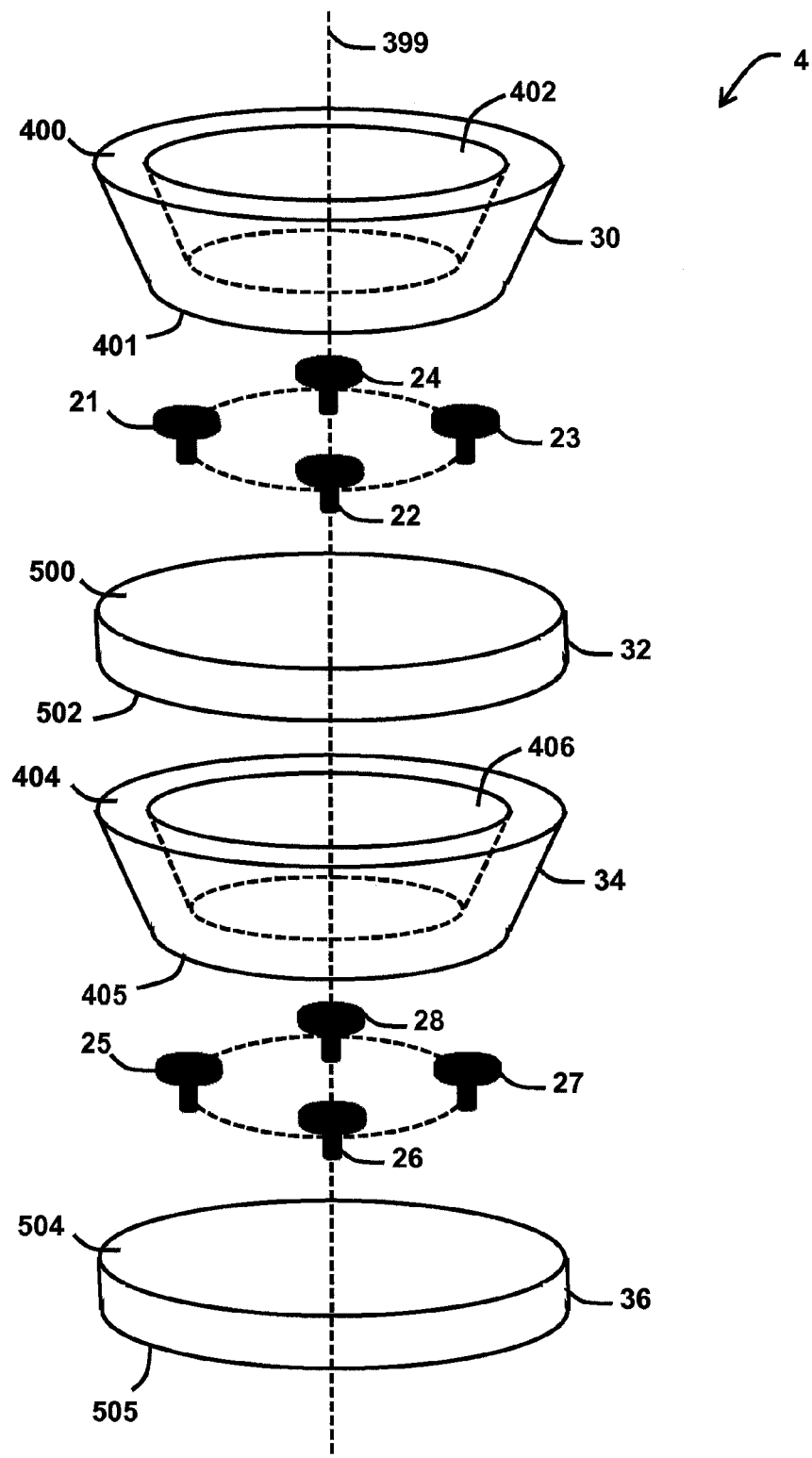
FIG. 3 is a schematic illustration of certain details of a radar antenna array.

FIG. 3 is a schematic illustration of certain details of the radar antenna array 4 of this embodiment. For the purposes of clarity and ease of understanding, FIG. 3 shows elements of the radar antenna array 4 in an "exploded" view.

The radar antenna array 4 comprises a first beam-shaping dish 30, a first transmission antenna 21, a second transmission antenna 22, a third transmission antenna 23, a fourth transmission antenna 24, a first beam-blocking plate 32, a second beam-shaping dish 34, a first reception antenna 25, a second reception antenna 26, a third reception antenna 27, an fourth reception antenna 28, and a second beam-blocking plate 36.

In this embodiment the first beam-shaping dish 30, the first beam-blocking plate 32, the second beam-shaping dish 34, and the second beam-blocking plate 36 have a common central axis 399 represented schematically in FIG. 3 by a dotted line.

In this embodiment, the first beam-shaping dish 30 has the shape of a circular frustum having two floors, hereinafter referred to as the "first floor 400" and the "second floor 401". The first floor 400 is opposite the second floor 401. The first floor 400 has a larger diameter than the second floor 401. The first beam-shaping dish 30 has a cavity, hereinafter referred to as the "first cavity 402", located in the first floor 400. The first cavity 402 has the shape of a circular frustum having a geometrically similar shape, a smaller size, a same orientation, and a common central axis 399 to the circular frustum shape of the first beam-shaping dish 30. In this embodiment the diameter of the first floor 400 is 0.15 m. The largest diameter of the first cavity 402 in the first floor 400 is 0.12 m. In this embodiment the diameter of the second floor 401 is 0.11 m. The thickness of the first beam-shaping dish 30, i.e. the distance between the first floor 400 and second floor 401 is 0.03 m.

In this embodiment, the first beam-blocking plate 32 has cylindrical shape. The first beam-blocking plate 32 comprises two circular surfaces, hereinafter referred to as the "first circular surface 500" and the "second circular surface 502". The first circular surface 500 is opposite the second circular surface 502. In this embodiment, the first circular surface 500 has a diameter of 0.14 m. In this embodiment, the second circular surface 502 has a diameter of 0.14 m.

In this embodiment, the second beam-shaping dish 34 has the shape of a circular frustum having two floors, hereinafter referred to as the "third floor 404" and the "fourth floor 405". The third floor 404 is opposite the fourth floor 405. The third floor 404 has a larger diameter than the fourth floor 405. The first beam-shaping dish 30 has a cavity, hereinafter referred to as the "second cavity 406", located in the third floor 404. The second cavity 406 has the shape of a circular frustum having a geometrically similar shape, a smaller size, a same orientation, and a common central axis 399 to the circular frustum shape of the second beam-shaping dish 34. In this embodiment the diameter of the third floor 404 is 0.15 m. The largest diameter of the second cavity 406 in the third floor 404 is 0.12 m. In this embodiment the diameter of the fourth floor 405 is 0.11 m. The thickness of the second beam-shaping dish 34, i.e. the distance between the third floor 404 and fourth floor 405 is 0.03 m.

In this embodiment, the second beam-blocking plate 36 has cylindrical shape. The second beam-blocking plate 36 comprises two circular surfaces, hereinafter referred to as the "third circular surface 504" and the "fourth circular surface 505". The third circular surface 504 is opposite the fourth circular surface 505. In this embodiment, the third circular surface 504 has a diameter of 0.14 m. In this embodiment, the fourth circular surface 505 has a diameter of 0.14 m.

In the following further description of the radar antenna array 4, the terminology 'below' and 'above' has been adopted. These terms are used merely to illustrate the relative positions of the certain elements of the radar antenna array 4. However, the radar antenna array 4 can be utilised in any orientation.

In this embodiment, the first beam-shaping dish 30 is positioned such that the first floor 400 is above the second floor 401. The first transmission antenna 21, the second transmission antenna 22, the third transmission antenna 23, and the fourth transmission antenna 24 are positioned between the first beam-shaping dish 30 and the first beam-blocking plate 32 such that they are below the second floor 401 and above the first circular surface 500. The first transmission antenna 21, the second transmission antenna 22, the third transmission antenna 23, and the fourth transmission antenna 24 are equally spaced on the first circular surface 500 and concentrically around the central axis 399. The beam-blocking plate 32 is positioned such that the first circular surface 500 is above the second circular surface 502. The second beam shaping dish 34 is below the first beam-blocking plate 32. The second beam-shaping dish 34 is positioned such that the third floor 404 is above the fourth floor 405. The first reception antenna 25, the second reception antenna 26, the third reception antenna 27, and the fourth reception antenna 28 are positioned between the second beam-shaping dish 34 and the second beam-blocking plate 36 such that they are below the fourth floor 405 and above the third circular surface 504. The first reception antenna 25, the second reception antenna 26, the third reception antenna 27, the fourth reception antenna 28 are equally spaced on the third circular surface 504 and concentrically around the central axis 399. The second beam-blocking plate 36 is positioned such that the third circular surface 504 is above the fourth circular surface 505.

In operation, the first transmission antenna 21 transmits a first microwave signal 6. The first microwave signal depends on the broadcast signal received from the transmitter 301, as described above with reference to FIG. 2. The first microwave signal 6 is shaped by the first beam-shaping dish 30 and directed in to a first region of airspace, as described in greater detail later below with reference to FIG. 4.

In operation, the second transmission antenna 22 transmits a second microwave signal 8. The second microwave signal 8 depends on the broadcast signal received from the transmitter 301, as described above with reference to FIG. 2. The second microwave signal 8 is shaped by the first beam-shaping dish 30 and directed in to a second region of airspace, as described in greater detail later below with reference to FIG. 4.

The third transmission antenna 23 transmits a third microwave signal. The third microwave signal depends on the broadcast signal received from the transmitter 301, as described above with reference to FIG. 2. The third microwave signal is shaped by the first beam-shaping dish 30 and directed in to a third region of airspace, as described in greater detail later below with reference to FIG. 4.

The fourth transmission antenna 24 transmits a fourth microwave signal. The fourth microwave signal depends on the broadcast signal received from the transmitter 301, as described above with reference to FIG. 2. The fourth microwave signal is shaped by the first beam-shaping dish 30 and directed in to a fourth region of airspace, as described in greater detail later below with reference to FIG. 4.

The first, second, third, and fourth microwave signals are blocked by the first beam blocking plate 32. This has the effect that each of the respective microwave signals transmitted from the transmission antennas 21, 22, 23, 24 are not directly received by respective reception antennas 25, 26, 27, 28. To be received by the respective reception antennas 25, 26, 27, 28, the respective microwaves signals have to be reflected from an object in the vicinity of the radar antenna array 4. This advantageously provides that the transmission antennas 21, 22, 23, 24 tend to be able to operate concurrently with the reception antennas 25, 26, 27, 28 without the respective transmitted microwave signals directly being received by the respective reception antennas 25, 26, 27, 28 without being reflected by an object.

Consider an object travelling in the vicinity of the radar antenna array 4, for example the bullet 10 as described above with reference to FIG. 2. The respective first, second, third, and/or fourth microwave signals are reflected from such an object if the object travels through the respective first, second, third, and/or fourth regions of airspace, i.e. if the object travels through the first region of airspace, part of the reflected first microwave signal 6 is received by the first reception antenna 25, if the object travels through the second region of airspace, part of the reflected second microwave signal 8 is received by the second reception antenna 26, if the object travels through the third region of airspace, part of the reflected third microwave signal is received by the third reception antenna 27, and if the object travels through the fourth region of airspace, part of the reflected fourth microwave signal is received by the fourth reception antenna 27, as described in greater detail later below with reference to FIG. 4.

Figure 4:
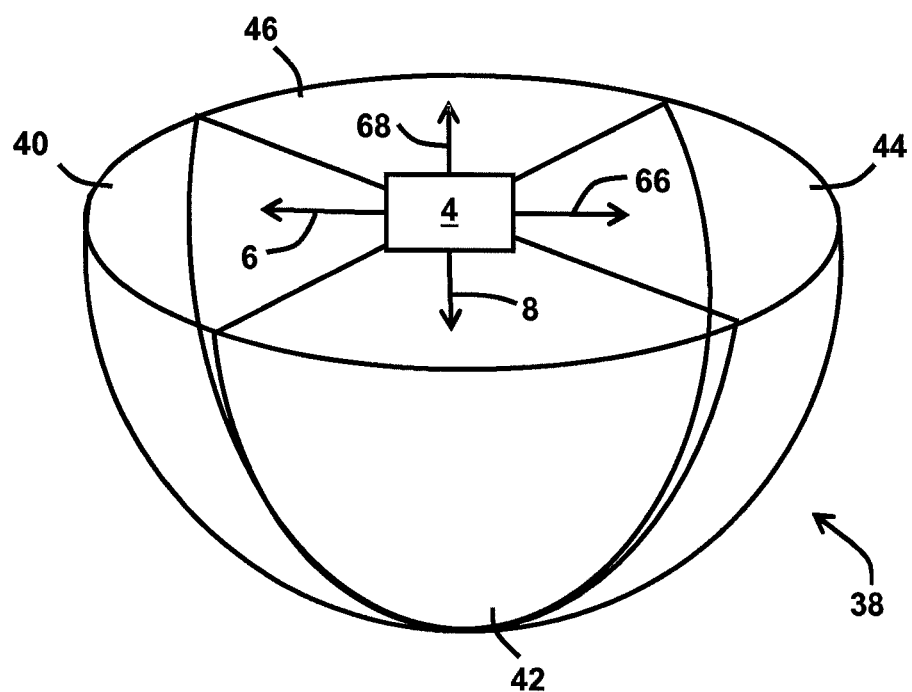
FIG. 4 is a schematic illustration of an airspace volume surrounding a radar antenna array into which, and from which, the radar antenna array transmits and receives microwave signals respectively.

FIG. 4 is a schematic illustration of an airspace volume 38 surrounding the radar antenna array 4 into which, and from which, the radar antenna array 4 transmits and receives microwave signals respectively. In this embodiment, the airspace volume 38 covers the maximum volume of airspace in which objects, for example the bullet 10, can be detected by the radar antenna array 4. The size of the airspace volume 38 is limited by, for example, the transmitter power, the gain of the transmitting antenna(s), the effective aperture of the receiving antenna(s), the radar cross section or scattering coefficient of the target, and/or the pattern propagation factor. For ease of explanation the boundary of the airspace volume 38 is considered a cut-off boundary for the microwave signals transmitted by the radar antenna array, i.e. the microwaves transmitted from the radar antenna array do not propagate outside the airspace volume 38. However, in practice such a discrete boundary does not exist, and instead the microwave signals will become weaker the further they travel from the radar antenna array 4.

For reasons of clarity and ease of understanding, the airspace volume 38 shown in FIG. 3 is schematically depicted as a hemisphere. However, the airspace volume 38 is not necessarily hemispherical. The airspace volume 38 can be any shape determined by the antennas and the beam-shaping dishes 30, 34. In this embodiment, the shape of the airspace volume 38 is determined by the first and second beam-shaping dishes 30, 34, as described above with reference to FIG. 3.

In this embodiment, the airspace volume 38 comprises a first segment 40, a second segment 42, a third segment 44, and a fourth segment 46.

In this embodiment, the first segment 40 corresponds to the respective distinct region of airspace into which the first microwave signal 6 is directed from the first transmission antenna 21 as described above with reference to FIGS. 1 to 3. The second segment 42 corresponds to the respective distinct region of airspace into which the second microwave signal 8 is directed from the second transmission antenna 22 as described above with reference to FIGS. 1 to 3. The third segment 44 corresponds to the respective distinct region of airspace into which the third microwave signal, schematically represented in FIG. 4 by an arrow and hereinafter indicated by the reference numeral 66, is directed from the third transmission antenna 23 as described above with reference to FIG. 3.

The fourth segment 46 corresponds to the respective distinct region of airspace into which the fourth microwave signal, schematically represented in FIG. 4 by an arrow and hereinafter indicated by the reference numeral 68, is directed from the fourth transmission antenna 24 as described above with reference to FIG. 3.

In this embodiment, the first segment 40, the second segment 42, the third segment 44, and the fourth segment 46 are each of approximately equal size. The entirety of the airspace volume 38 is encompassed by the first, second, third and fourth segments. Each of the segments 40, 42, 44, 46 has a volume approximately equal to a quarter of the airspace volume 38.

In this embodiment, the components of the radar antenna array 4 are arranged and operated so that the respective first, second, third, and fourth microwave signals, that are directed in to the respective first, second, third, and fourth regions of airspace, do not overlap. Thus, the first, second, third and fourth segments do not overlap. This provides the following.

The second, third and fourth microwave signals are not transmitted in to the first segment 40. During the time an object is travelling in the first segment 40, the object only reflects the first microwave signal 6. The second, third and/or fourth microwave signals 8, 66, 68 are not reflected by the object. Moreover, the reflected first microwave signal is only received by the first reception antenna 25, i.e. the reflected first microwave signal is not received by the second, third and/or fourth reception antennas 26, 27, 28.

The first, third and fourth microwave signals are not transmitted in to the second segment 42. During the time an object is travelling in the second segment 42, the object only reflects the second microwave signal 8. The first, third and/or fourth microwave signals 6, 66, 68 are not reflected by the object. Moreover, the reflected second microwave signal is only received by the second reception antenna 26, i.e. the reflected second microwave signal is not received by the first, third and/or fourth reception antennas 25, 27, 28.

The first, second and fourth microwave signals are not transmitted in to the third segment 44. During the time an object is travelling in the third segment 44, the object only reflects the third microwave signal 66. The first, second and/or fourth microwave signals 6, 8, 68 are not reflected by the object. Moreover, the reflected third microwave signal is only received by the third reception antenna 27, i.e. the reflected third microwave signal is not received by the first, second and/or fourth reception antennas 25, 26, 28.

The first, second and third microwave signals are not transmitted in to the fourth segment 46. During the time an object is travelling in the fourth segment 46, the object only reflects the fourth microwave signal 68. The first, second and/or third microwave signals 6, 8, 66 are not reflected by the object. Moreover, the reflected fourth microwave signal is only received by the fourth reception antenna 28, i.e. the reflected fourth microwave signal is not received by the first, second and/or third reception antennas 25, 26, 27.

Figure 5:
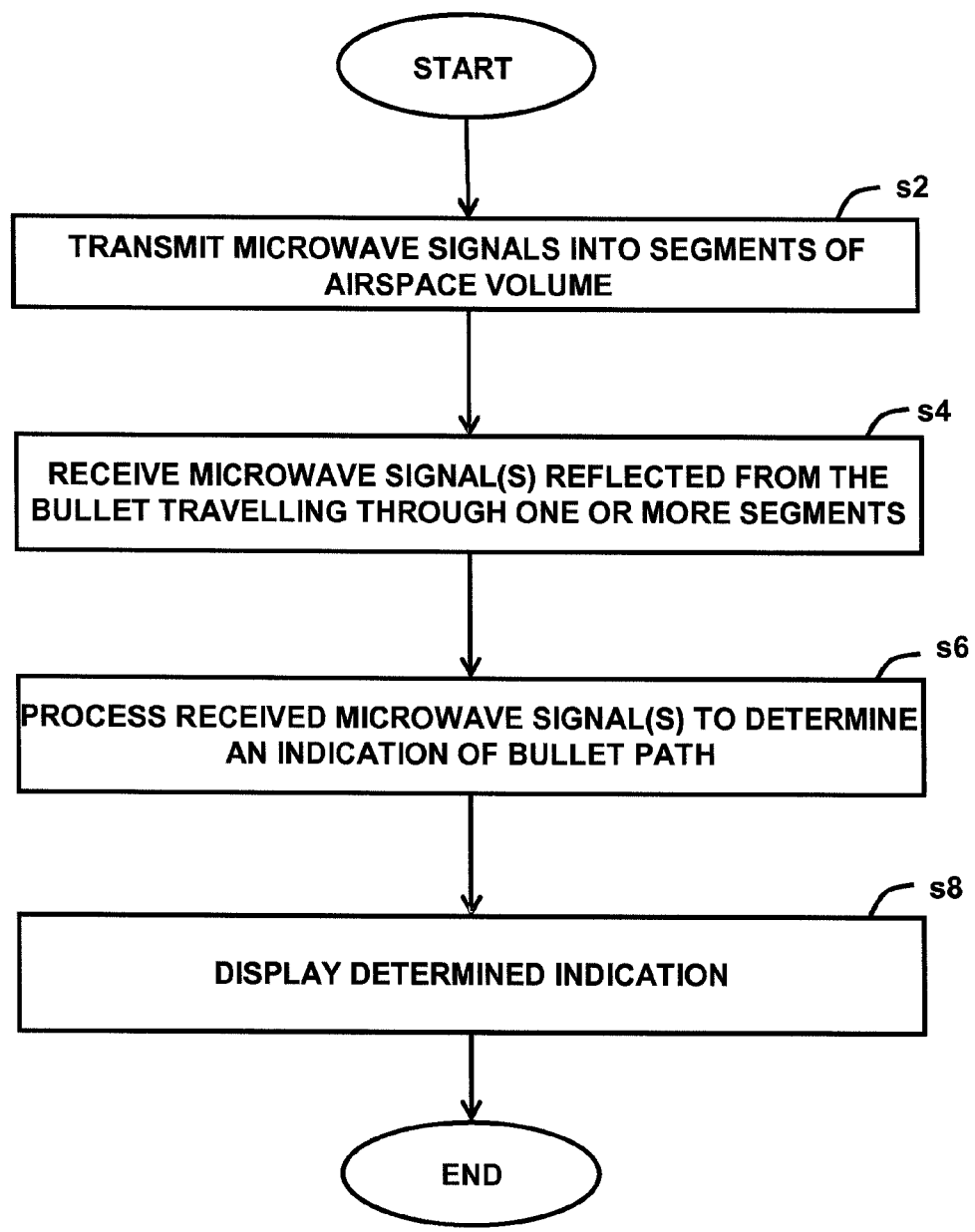
FIG. 5 is a process flow chart showing certain steps of an embodiment of a bullet detection process.

FIG. 5 is a process flow chart showing certain steps of an embodiment of a bullet detection process.

At step s2, the first, second, third, and fourth microwave signals 6, 8, 66, 68 are transmitted by the first, second, third, and fourth transmission antennas 21, 22, 23, 24 respectively and directed into the first, second, third, and fourth segments 40, 42, 44, 46 of the airspace volume 38 respectively. A continuous waveform (CW) is used. This allows the arrangement to accommodate the high speed of the bullet and hence the relatively short range window.

At step s4, microwave signals reflected from an object, i.e. the bullet 10 in this example, are received by one or more of the reception antennas 25, 26, 27, 28 of the radar antenna array 4. In this example, each of the first, second, third or fourth microwave signals are only reflected by the bullet 10 if the bullet 10 travels through the segment into which the respective microwave signal is transmitted. Thus, which of the radar antenna or antennas receive a reflected microwave signal depend on the bullet path 12.

Figure 6:
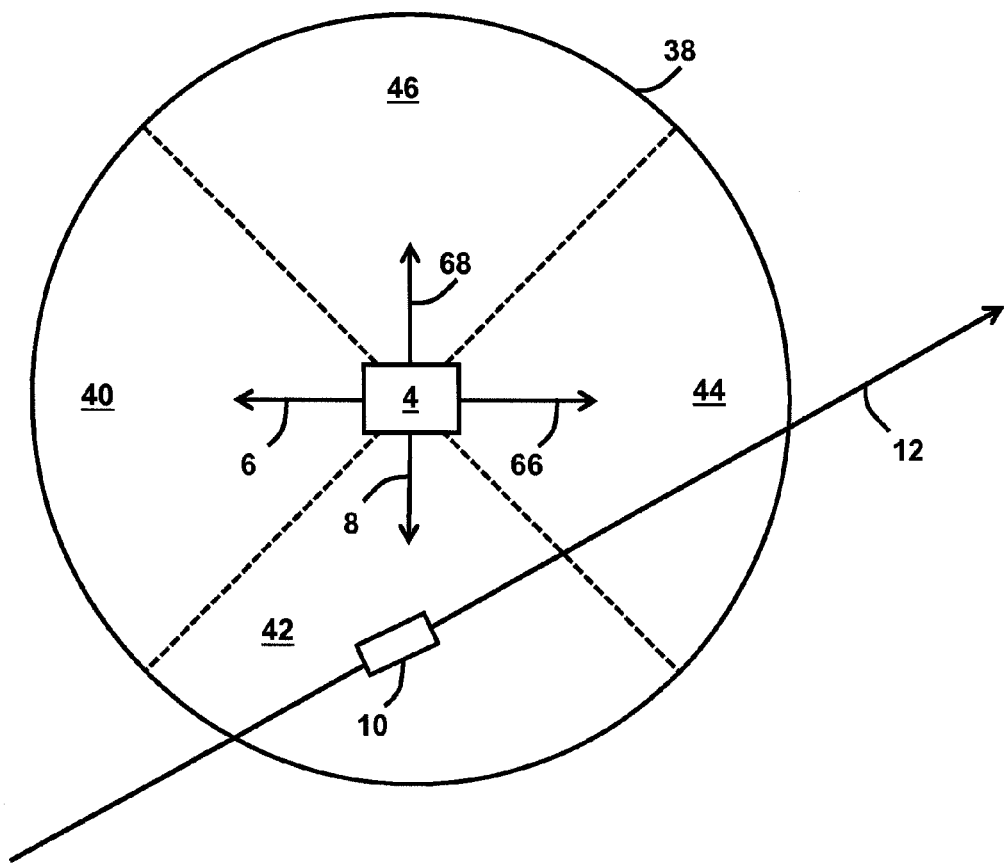
FIG. 6 is a schematic illustration of a two-dimensional top-down view of an airspace volume surrounding the radar antenna array.

FIG. 6 is a schematic illustration of a two-dimensional top-down view of the airspace volume 38 surrounding the radar antenna array 4, as described above with reference to FIG. 4. In addition to the entities described in FIG. 4, FIG. 5 shows the bullet 10 and the bullet path 12. Steps s6 and s8 of the process of FIG. 5 described above will be described after the discussion of FIG. 6.

As shown in FIG. 6, in this example the bullet path 12 intersects the second segment 42 and the third segment 44. In other words, in this example the bullet 10 travels through the second segment 42 and then the third segment 44.

During the time the bullet 10 travels through the second segment 42, the second microwave signal 8, which is transmitted from the second transmission antenna 22 of the radar antenna array 4, is reflected by the bullet 10. A portion of the reflected second microwave signal is directed back to the radar antenna array 4. This portion of the reflected second microwave signal is received by the second reception antenna 26 and forwarded to the receiver 302.

During the time the bullet 10 travels through the third segment 44, the third microwave signal 66, which is transmitted from the third transmission antenna 23 of the radar antenna array 4, is reflected by the bullet 10. A portion of the reflected third microwave signal is directed back to the radar antenna array 4. This portion of the reflected third microwave signal is received by the third reception antenna 28 and forwarded to the receiver 302. In this example, the portion of the reflected third microwave signal is received by the third reception antenna 28 after the second reception antenna 26 receives its respective signal. This is because the bullet 10 travels through the third segment 44 after it travel through the second segment. Thus, the third microwave signal 66 is reflected from the bullet 10 after the second microwave signal 8 is reflected from the bullet 10.

In this example the bullet 10 does not travel through the first segment 40 or the fourth segment 46. Thus, the first microwave signal 6 and the fourth microwave signal 68 are not reflected by the bullet 10. Thus, the first reception antenna 25 and the fourth reception antenna 28 do not receive microwave signals reflected by the bullet.

At step s6, the reflected microwave signals received by the second reception antenna 26 and the third reception antenna 27, and forwarded to the receiver 302, are processed to determine an indication of the bullet path 12.

In this embodiment the processor 3 compares the frequency of the microwave signal sent by the transmission antennas of the radar antenna array 4 to that reflected from the bullet 10 and received by the radar antenna array 4, allowing for the direct and highly accurate measurement of target velocity component in the direction of the beam. In this way, the processor 3 uses the Doppler Effect of the returned microwave signals from the bullet to determine its radial velocity.

In this embodiment, the processor 3 operates to reduce the effects of clutter. In this example, clutter refers to unwanted radar echoes, for example from ground, sea, rain, animals/insects, chaff and/or atmospheric turbulences.

For a helicopter, ground clutter is likely to be one of the limiting factors and will produce one of the largest unwanted signals that the processor 3 has to handle. Clutter backscatter power, $P_c$, includes surface returns at all ranges. The precise calculation requires integration over azimuth all ranges from the platform height to the clutter horizon:

$$P_c = \frac{P_t G_t G_r \lambda^2}{(4\pi)^3 L} \int_{-\pi}^{\pi} \int_{H}^{R_H} \frac{\sigma_0(\phi(R))\sec(\phi(R))}{R^3} f_r^4(\phi(R) - \phi_0, \theta) dR d\theta$$

where:

$$\phi(R) = \sin^{-1}\frac{H}{R}$$

is the elevation angle to the ground at range R from the radar;
$P_t$ is the transmit power (W);
$G_t$, $G_r$ are the transmit and receive gain respectively;
$\lambda$ is the radar wavelength (m);
L includes all radar losses;
$\sigma_0$ is the clutter reflectivity;
H is the radar height (m);
R is range (m);
$R_H$ is the range to the clutter horizon;
$\phi_0$ is the elevation boresight (radians); and
$f_r(\phi,\theta)$ is the one way antenna voltage pattern at elevation angle $\phi$ and azimuth angle $\theta$.

A complication of the above equation is that it neglects the fact that the clutter return at different points on the surface have different Doppler. In order to fully determine clutter power, points on the surface which contribute to each Doppler bin are defined and the integrand is integrated over this area.

Clutter reflectivity (normalised radar cross-section) is highly dependent on grazing angle as well as clutter type and surface roughness. A representative clutter model is given by:

$$\sigma_0 = \gamma\sin(\theta) + \alpha\exp\left(-\frac{(\frac{\pi}{2} - \theta)^2}{v^2}\right)$$

where:
$\alpha,\gamma$ are constants dependent on clutter type;
$\theta$ is the grazing angle (radians); and
v is a surface roughness parameter (radians)

In this example, if the helicopter 100 descends the clutter level will increase, for example, the helicopter 100 descending from 100 m altitude to 10 m results in a clutter increase of approximately 40 dB. The clutter to noise ratio becomes almost 40 dB. An allowance for additional "head room" at the ADC to prevent limiting is used as clutter modes are just theoretical models, and the reality can be significantly different. The ADC in a receiver can be considered like any other RF black box and has a noise figure. Its gain can be considered to be one. To ensure that the noise floor of the ADC does not significantly degrade the signal to noise ratio of the input signal it is necessary to ensure that the receiver noise floor is above the ADC's noise floor. Setting the receiver noise 10 dB above the ADC noise results in a 0.4 dB conversion loss to the ADC (degrades the signal to noise by 0.4 dB).

Taking into account the placing of the receiver noise above the ADC's noise floor (10 dB), the higher level of clutter when closer to the ground (~40 dB) and 10 dB additional headroom, the ADC's dynamic range is ~60 dB. Thus at least a 12 bit ADC is desirable, though 14 bits are preferable.

Radar performance is statistically-based with both probability of detection and probability of false alarm required to define performance. For a probability of false alarm of $10^{-6}$ and a 90% probability of detection the required signal to noise ratio (SNR) is approximately 13 dB for Swerling 1 targets. At an altitude of 10 meters the processed SNR is estimated as 17.3 dB which then meets the above requirements. An improvement in SNR can be achieved by increasing the transmitter power. For instance increasing the transmitter power from 0 dBm (1 mW) to 10 dBm would increase the processed SNR by 10 dB. This also increases the bullet detection range. For a 13 dB SNR the detection range for 10 mW of the transmitter power is approximately 21 meters for a BMG round. By increasing the transmit power the detection range increases, however, there are limitations imposed on the dynamic range by direct signal break through as the transmitter is always on, and limits to the ADC dynamic range.

At low altitudes (10 m) the clutter is estimated to be some 10 dB above the noise floor. The signal level for a bullet at the same range is estimated to be 13 dB below the noise floor. A processing gain of ≈29 dB is expected giving an SNR of ≈16 dB. The clutter power is distributed over several Doppler bins. However assuming that the DC clutter dominates the clutter power then the clutter level in the DC bin would be 69 dB above the noise floor. To facilitate that the detection process is performed against noise, rather than clutter, the side lobe response of the Doppler filters preferably suppress the stationary clutter level to below the noise floor in the Doppler bin where the bullet is being detected. For this example, 80 dB of sidelobe suppression the clutter provides for the clutter to be 10 dB below the noise. The applied Doppler weighting could provide a uniform sidelobe level. However, a Doppler weighting which falls off further as one moves away from the Doppler bin centre frequency is preferable due to the frequency separation of the high velocity bullets and the lower velocity clutter.

In this example, the processor 3 processes the received signals using the following algorithm.

For each respective microwave signal forwarded to the receiver 302 from the respective reception antennas of the radar antenna array 4, the processor 3 reads out a clock value from the clock 300. In this example, the processor 3 reads out a first clock value for the forwarded microwave signal received by the receiver 302 from the second reception antenna 26. In this example, the processor 3 reads out a second clock value for the forwarded microwave signal received by the receiver 302 from the third reception antenna 27. In this example, the second clock value is later than the first clock value because the forwarded microwave signal from the third reception antenna 27 is received at the receiver 302 after the forwarded microwave signal from the second reception antenna.

The processor 3 compares the respective clock values of the respective forwarded microwave signals to determine the segment the detected object first travelled through. In this embodiment, the segment the detected object first travelled through is the segment observed by the reception antenna that forwarded the microwave signal with the earliest clock value.

If forwarded microwave signals are received at the receiver 302 from more than one reception antenna 25, 26, 27, 28, then the processor 3 compares the respective clock values of the respective forwarded microwave signals to determine the order in which the detected object travels through the segments. In this embodiment, the order of the segments the detected object travelled through is the segment corresponding to the microwave signal with the earliest clock value, followed by the segment corresponding to the microwave signal with the next earliest clock value and so on.

In this example, the processor 3 compares the first and second clock values. The processor 3 determines that the first clock value is earlier than the second clock value. Thus, the processor determines that the bullet 10 travelled through the segment corresponding to the microwave signal assigned the first clock value first, followed by the segment corresponding to the microwave signal assigned the second clock value. Thus, the processor 3 determines that an object, in this case the bullet 10, travelled through the second segment 42 followed by the third segment 44.

The processor generates an indication of the direction of a detected object. In this embodiment, the indication has the following form. The indication of the direction of the bullet lists the segments through which the bullet travelled, in the order in which the bullet travelled through them, for example:
"SEGMENT ?, SEGMENT ?, . . . "
Thus, in this example the processor 3 generates the indication "2, 3" indicating that the bullet 10 travelled through the second segment 42 first, and travelled through third segment 44 afterwards.

At step s8, the indication of the direction of the bullet 10 is displayed. The displayed indication of direction may be used, for example, to determine whether it is necessary to perform evasive manoeuvres, or to identify an enemy position.

Thus, the above described process advantageously provides a bullet detection process that tends to provide an indication of the direction of incoming fire, for example, from an enemy combatant.

In the above embodiment, the components of the radar antenna array 4 are arranged and operated so that the respective first, second, third, and fourth microwave signals, that are directed in to the respective first, second, third, and fourth regions of airspace, do not overlap. Thus, the first, second, third and fourth segments do not overlap. A further embodiment, in which the components of the radar antenna array 4 are arranged and operated so that certain microwave signals do overlap, i.e. certain segments overlap, will now be described with reference to FIG. 7.

Figure 7:
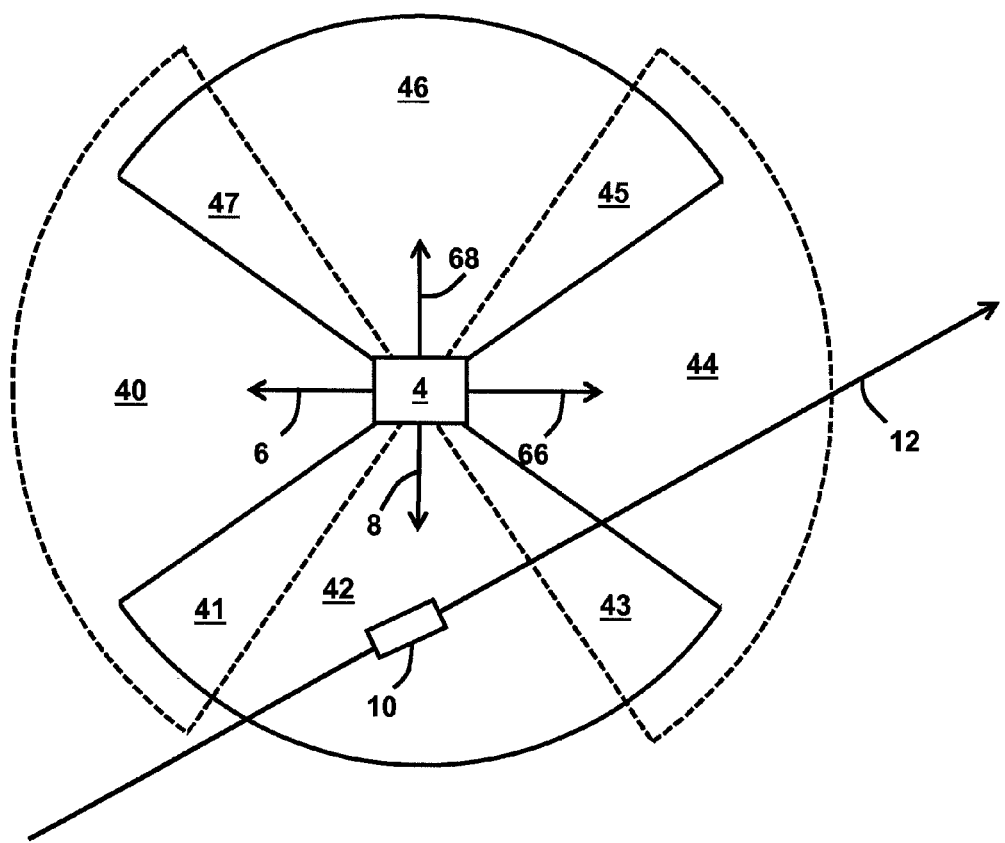
FIG. 7 is a schematic illustration of a two-dimensional top-down view of an airspace volume surrounding the radar antenna array.

FIG. 7 is a schematic illustration of a two-dimensional top-down view of the airspace volume 38 surrounding the radar antenna array 4. The same entities as those described above with reference to FIG. 6 are shown in FIG. 7 using the same reference numerals. As shown in FIG. 7, in this embodiment the first segment 40 overlaps the second segment 42 and the fourth segment 46. In addition, the second segment 42 overlaps the third segment 44. In addition, the third segment 44 overlaps the fourth segment 46. The overlap between the first segment 40 and the second segment 42 is hereinafter referred to as the "first overlap 41". The overlap between the second segment 44 and the third segment 44 is hereinafter referred to as the "second overlap 43". The overlap between the third segment 44 and the fourth segment 46 is hereinafter referred to as the "third overlap 45". The overlap between the fourth segment 46 and the first segment 40 is hereinafter referred to as the "fourth overlap 47".

As described above for the previous embodiment, in this embodiment the respective first, second, third, and/or fourth microwave signals are reflected by an object if the object travels through the respective first, second, third, and/or fourth regions of airspace. Also, the respective reflected first, second, third, and/or fourth microwave signals are received by the respective first, second, third, and fourth reception antennas, as described above in the previous embodiment.

The above described overlapping of certain segments provides the following. An object travelling through the first overlap 41 reflects both the first microwave signal 6 and the second microwave signal 8. The reflected first and second microwave signals are received by the first and second reception antennas respectively. An object travelling through the second overlap 43 reflects both the second microwave signal 8 and the third microwave signal 66. The reflected second and third microwave signals are received by the second and third reception antennas respectively. An object travelling through the third overlap 45 reflects both the third microwave signal 66 and the fourth microwave signal 68. The reflected third and fourth microwave signals are received by the third and fourth reception antennas respectively. An object travelling through the fourth overlap 47 reflects both the first microwave signal 6 and the fourth microwave signal 68. The reflected first and fourth microwave signals are received by the first and fourth reception antenna respectively.

Performing a bullet detection process on the bullet 10 in this embodiment, i.e. the bullet 10 shown in FIG. 7, will now be described. In this embodiment, the bullet detection process is carried out by performing the same steps as in the bullet detection process of the previous embodiment described above with reference to FIG. 5, except for certain differences as mentioned below.

At step s2, the first, second, third, and fourth microwave signals 6, 8, 66, 68 are directed into the first, second, third, and fourth segments 40, 42, 44, 46, as in the previous embodiment. However, in this embodiment, certain segments overlap, as described above.

At step s4, during the time the bullet 10 travels through the part of the second segment 42 that does not include the second overlap 43, the second microwave signal 8 is reflected by the bullet 10. A portion of the reflected second microwave signal is directed back to the radar antenna array 4. This portion of the reflected second microwave signal is received by the second reception antenna 26 and forwarded to the receiver 302.

During the time the bullet 10 travels through the second overlap 43, the second microwave signal 8 and the third microwave signal 66 are reflected by the bullet 10. A portion of the reflected second microwave signal is received by the second reception antenna 26 and forwarded to the receiver 302. Concurrently, a portion of the reflected third microwave signal is received by the third reception antenna 27 and forwarded to the receiver 302. The microwave signals received from the bullet 10 as it travels through the second overlap 43, are received at the receiver 302 after the microwave signals received from the bullet 10 as it passes through only the second segment 42 (i.e. the part of the second segment 42 that does not include the first overlap 41 or the second overlap 43). This is because, in this example, the bullet travels through the second overlap 43 after it travels through the part of the second segment 42 that does not include the first overlap 41 or the second overlap 43.

During the time the bullet 10 travels through the part of the third segment 44 that does not include the second overlap 43, the third microwave signal 66 is reflected by the bullet 10. A portion of the reflected third microwave signal is directed back to the radar antenna array 4. This portion of the reflected third microwave signal is received by the third reception antenna 28 and forwarded to the receiver 302. The microwave signals received from the bullet 10 as it travels through the third segment 44 only (i.e. the part of the third segment 44 that does not include the second overlap 43 or the third overlap 45) are received at the receiver 302 after the microwave signals received from the bullet 10 as it passes through the second overlap 43. This is because, in this example, the bullet 10 travels through the second overlap 43 after it travels through the part of the third segment 44 that does not include the second overlap 43 or the third overlap 45.

At step s6, the received reflected microwave signals are processed by the processor 3, to determine an indication of the bullet path 12, using the following algorithm, which is analogous to the algorithm used in the previous embodiment.

The processor 3 reads out clock values from the clock 300 for the received microwave signals. In this example, the processor 3 reads out clock values for the forwarded microwave signal received by the receiver 302 from the second reception antenna 26. Also, the processor 3 reads out a second clock value for the forwarded microwave signal received by the receiver 302 from the third reception antenna 27. In this example, some of the later clock values read for the microwave signal received at the second reception antenna 26 are the same as some of the earlier clock values read for the microwave signal received at the third reception antenna 27. This is because microwave signals were received at the same time by both the second and third reception antennas 26, 27 (i.e. when the bullet 10 travelled through the second overlap 43).

The processor 3 compares the respective clock values of the respective forwarded microwave signals to determine order of the segments the bullet travelled through. The earlier the clock value of a microwave signal is, the earlier the bullet 10 travelled through the segment corresponding to that microwave signal. If, for a duration of time, two microwave signals have the same clock value, then the bullet 10 travelled through the overlap of the segments corresponding to the two microwave signals, for that duration of time.

In this example, the processor 3 compares the read clock values. The processor 3 determines earliest clock values correspond to the microwave signal received at the second reception antenna, and that the latest clock values correspond to the microwave signal received at the third reception antenna, and that these clock values overlap, i.e. that microwave signals were received at the second and third reception antennas simultaneously. Thus, the processor determines that the bullet 10 travelled through the non-overlapping part of the second segment 42, followed by the second overlap 43, followed by the non-overlapping part of the third segment 44.

The processor generates an indication of the direction of a detected object, in the same way as the previous embodiment. Thus, in this example the processor 3 generates the indication "2, ⅔, 3" indicating that the bullet 10 travelled through the non-overlapping part of second segment 42 first, followed by the overlap between the second and third segments (the second overlap 43), followed by the non-overlapping part of the third segment 44.

At step s8, the indication of the direction of the bullet 10 is displayed. The displayed indication of direction may be used, for example, to determine whether it is necessary to perform evasive manoeuvres, or to identify an enemy position.

Thus, in addition to above mentioned advantages, the present embodiment of a bullet detection system tends to provide a more accurate indication of bullet path and/or the direction of incoming bullets. This is achieved by overlapping the detection regions of the antenna in the radar antenna array 4.

In the above embodiments, the bullet detection system 1 is attached to a helicopter. However, in other embodiments the bullet detection system may be attached to a different type of aircraft, or to any other appropriate type of vehicle, for example a tank. Also possible is use with any appropriate form of autonomous or unmanned vehicle, for example an unmanned air vehicle.

In the above embodiments, the components of the bullet detection system are attached externally to the helicopter. However, in other embodiments the components are distributed in a different manner. For example, in other embodiments one or more of the components of the bullet detection system are inside the helicopter. One particularly advantageous arrangement is for the controller 2 to be carried inside the helicopter and the radar antenna array to be attached to the outside of the helicopter.

In the above embodiments, the bullet detection system is used to detect and determine the direction of a single bullet. However, in other embodiment the bullet detection system is used to detect and determine the direction of any number of bullets travelling in any directions at the same or different times. This may include detection of machine gun fire.

In the above embodiments, the bullet detection system is used to detect and determine the direction of bullets. However, in other embodiments other objects are detected and/or their direction determined.

In the above embodiments, a single radar antenna array is used. However, in other embodiments other numbers of radar antenna arrays are used.

In the above embodiments, the components of the bullet detection system are configured as explained above with reference to FIG. 2. However, in other embodiments the components of the bullet detection system are configured in a different way so as to provide the same or corresponding functionality. Also, in other embodiments different components are used and configured in the same or different ways to those described above, so as to provide the same or corresponding functionality.

In the above embodiments, four microwave signals are transmitted from, and/or received at, the radar antenna array. However, in other embodiments any number of microwave signals is transmitted from, and/or received at, the radar antenna array.

In the above embodiments, microwave signals are directed into four distinct regions of airspace, i.e. the first, second, third, and fourth segments. However, in other embodiments, microwave signals are directed into any number of distinct regions of airspace, i.e. there are any number of segments.

In the above embodiments, the radar antenna array comprises a first beam-shaping dish and a second beam-shaping dish. The beam-shaping dishes have the shape and dimensions described above with reference to FIG. 3. However, in other embodiments the radar antenna array comprises any number of beam-shaping dishes. In other embodiments, the beam-shaping dishes have different appropriate shape and/or dimensions. In other embodiments, the radar antenna array comprises any number of different components that provide the same functionality.

In the above embodiments, the radar antenna array comprises a first transmission antenna, a second transmission antenna, a third transmission antenna, a fourth transmission antenna, However, in other embodiments the radar antenna array comprises any number of transmission antennas. In other embodiments, the radar antenna array comprises any number of different components that provide the same functionality.

In the above embodiments, the radar antenna array comprises a first beam-blocking plate and a second beam-blocking plate. The beam-blocking plates have the shape and dimensions described above with reference to FIG. 3. However, in other embodiments the radar antenna array comprises any number of beam-blocking plates. In other embodiments, the beam-blocking plates have different appropriate shape and/or dimensions. In other embodiments, the radar antenna array comprises any number of different components that provide the same functionality.

In the above embodiments, the radar antenna array comprises a first reception antenna, a second reception antenna, a third reception antenna, an fourth reception antenna, and.

However, in other embodiments the radar antenna array comprises any number of reception antennas. In other embodiments, the radar antenna array comprises any number of different components that provide the same functionality.

In the above embodiments, the region of airspace in which the bullet can be detected is a hemisphere. However, in other embodiments the region of airspace is a different shape.

In the above embodiments, the region of airspace is divided into four segments, as described above with reference to FIG. 4. However, in other embodiments the region of airspace is divided into four segments in a different manner. For example, in other embodiments a single microwave signal is directed into four different segments by using blocking plates to divide the signal into four signals.

In the above embodiments, the segments that the region of airspace is divided in to, i.e. the segments into which (and from which) the microwave signals are directed (and received), are either not overlapping as described above with reference to FIG. 6, or partially over-lapping as described above with reference to FIG. 7. However, in other embodiments the segments overlap to a different extent and/or in a different way.

In the above embodiment, the size of a segment of the region of airspace into which a transmission antenna directs a microwave signal is the same as the size of a segment of the region of airspace from which a reception antenna receives a reflected microwave signal. However, in other embodiments the size of one or more segments of the region of airspace into which a transmission antenna directs a microwave signal is different to the size of one or more segments of the region of airspace from which a reception antenna receives a reflected microwave signal. In other embodiments, one or more segments of the region of airspace from which a reception antenna receives a reflected microwave signal overlap, whilst the segments into which transmission antennas direct a microwave signal do not overlap, and vice versa. For example, in other embodiments the segments into which transmission antennas direct a microwave signal do not overlap as described above with reference to FIG. 6 and the segments of the region of airspace from which a reception antenna receives a reflected microwave signal overlap.

In the above embodiments, clock values are used to determine the order in which the reflected microwave signals are received. Use of the clock values in this way represents a relatively simple form of processing for providing a determination of the time-order of the received microwave signals. However, in other embodiments more complex forms of processing using the clock information may be used to determine timing information of the received microwave signals, or any other appropriate information, for example the Doppler profile of the bullet.

In the above embodiments, the processor uses the algorithm, as described above with reference to FIG. 5, to determine the direction of the bullet. However, in other embodiments different algorithms may be used.

In the above embodiments, the processor generates an indication of the direction of the bullet, as described above with reference to FIG. 5. However, in other embodiments the direction of the bullet is indicated in a different way In the above embodiments, the generated indication of the direction of the bullet is displayed. However, in other embodiments the indication is not displayed. In other embodiments a different action is performed. For example, in other embodiments, automatic evasive manoeuvres are performed by the vehicle, for example, as instructed by a computer.

In the above embodiments, the processor uses the Doppler effect of the returned microwave signals from the bullet to determine the radial velocity of the bullet. In other embodiments, the processor uses a calculated radial velocity in addition to or instead of the Doppler Effect to determine the bullet trajectory and/or a classification for the bullet, such as bullet type.

In the above embodiments, a continuous waveform (CW) is used for the microwave signals. This advantageously provides that the receivers do not need to be switched off during transmission, i.e. there is no requirement for a duplexer to be used. Moreover, the use of CW tends to advantageously simplify the hardware design. However, in other embodiments a different transmit waveform, or a combination of the same and different transmit waveforms may be used. For example, a pulsed waveform could be used. This would enable the range to the target to be directly measured, for example by inferring range from the target's velocity profile. Also, frequency modulated continuous waveforms (FMCW) can be used.

In the above embodiments, the bullet detection system uses four pairs of antennas formed in a single radar antenna array. However, in other embodiments the bullet detection system uses any number of separate antennas, i.e. antennas not formed in an array, to provide the same functionality. In other embodiments, a combination of any number of separate antennas, and any number of antennas formed in any number of arrays are used.

The invention claimed is:

1. A bullet detection system for use on a vehicle, the bullet detection system comprising:
a radar antenna array arranged to transmit and receive microwave signals so as to provide a plurality of detection segments of a volume of airspace and comprising a plurality of transmitters, each transmitter in the plurality being arranged relative to a first beam shaping means to transmit microwave signals into a respective segment of the plurality of segments; a plurality of receivers, each receiver being arranged relative to a second beam shaping means to receive microwave signals reflected by the bullet from a respective segment of the plurality of segments; and shielding means arranged to prevent microwave signals transmitted from a transmitter being directly received by the at least one receiver without first being reflected by an object;
one or more processors configured to:
determine which segments of the plurality of segments received microwave signals reflected by the bullet are received from;
determine timing information relating to a time order in which the received microwave signals are received in each segment microwave signals reflected by the bullet are received from; and
determine directional information relating to a direction of travel of the bullet from segment to segment based on the determined segments in which the received microwave signals reflected by the bullet are received from and the determined timing order in which the received microwave signals are received; wherein
the microwave signals have a frequency between 1 GHz and 30 GHz.

2. A projectile detection system according to claim 1, wherein the microwave signals have a frequency between 7 GHz and 17 GHz.

3. A projectile detection system according to claim 1, wherein the microwave signals have a frequency between 10 GHz and 14 GHz.

4. A projectile detection system according to claim 1, wherein the microwave signals have a continuous waveform.

5. A projectile detection system according to claim 1, wherein the volume of airspace is a volume of airspace substantially surrounding a portion of the vehicle.

6. A projectile detection system according to claim 1, wherein at least two of the segments overlap to some extent.

7. A projectile detection system according to claim 1, further comprising means for determining a radial velocity of the projectile.

8. A projectile detection system according to claim 7, wherein the means for determining a radial velocity of the projectile is adapted to determine a radial velocity of the projectile using a Doppler profile of the received microwave signals.

9. A vehicle comprising a projectile bullet detection system, the bullet detection system comprising:
- a radar antenna array arranged to transmit and receive microwave signals so as to provide a plurality of detection segments of a volume of airspace and comprising a plurality of transmitters, each transmitter in the plurality being arranged relative to a first beam shaping means to transmit microwave signals into a respective segment of the plurality of segments; a plurality of receivers, each receiver being arranged relative to a second beam shaping means to receive microwave signals reflected by the bullet from a respective segment the plurality of segments; and shielding means arranged to prevent microwave signals transmitted from a transmitter being directly received by the at least one receiver without first being reflected by an object;
- one or more processors configured to:
- determine which segments of the plurality of segments received microwave signals reflected by the bullet are received from;
- determine timing information relating to a time order in which the received microwave signals are received in each segment microwave signals reflected by the bullet are received from; and
- determine directional information relating to a direction of travel of the bullet from segment to segment based on the determined segments in which the received microwave signals reflected by the bullet are received from and the determined timing order in which the received microwave signals are received; wherein the microwave signals have a frequency between 1 GHz and 30 GHz.

10. A vehicle comprising according to claim 9, wherein the vehicle is an aircraft.

11. A method of detecting a bullet comprising:
transmitting microwave signals from a plurality of transmitters, each transmitter in the plurality being arranged relative to a first beam shaping means to transmit microwave signals into a respective segment of a plurality of detection segments of a volume of airspace;
receiving microwave signals from a plurality of receivers, each receiver being arranged relative to a second beam shaping means to receive microwave signals reflected by the bullet from a respective segment of the plurality of segments; and
processing the received microwave signals by a processor comprising hardware and instructions causing the processor to perform the steps of:
- determining which segments of the plurality of segments received microwave signals reflected by the bullet are received from;
- determining timing information relating to a time order in which the received microwave signals are received in each segment microwave signals reflected by the bullet are received from; and
- determining directional information relating to a direction of travel of the bullet from segment to segment based on the determined segments in which the received microwave signals reflected by the bullet are received from and the determined timing order in which the received microwave signals are receive; wherein
the microwave signals each have a frequency between 1 GHz and 30 GHz.

12. A method according to claim 11, wherein the microwave signals each have a frequency between 7 GHz and 17 GHz.

13. A method according to claim 11, wherein the microwave signals each have a frequency between 10 GHz and 14 GHz.

* * * * *